United States Patent
Nakahara et al.

(10) Patent No.: US 8,405,741 B2
(45) Date of Patent: Mar. 26, 2013

(54) ZOOM ADJUSTMENT SYSTEM AND CAMERA

(75) Inventors: Naoto Nakahara, Saitama (JP); Satoru Yamaguchi, Saitama (JP)

(73) Assignee: Pentax Ricoh Imaging Company, Ltd., Tokyo (JP)

(*) Notice: Subject to any disclaimer, the term of this patent is extended or adjusted under 35 U.S.C. 154(b) by 222 days.

(21) Appl. No.: 12/629,961

(22) Filed: Dec. 3, 2009

(65) Prior Publication Data

US 2010/0149405 A1  Jun. 17, 2010

(30) Foreign Application Priority Data

Dec. 12, 2008  (JP) ................... 2008-317518

(51) Int. Cl.
*H04N 5/262* (2006.01)
(52) U.S. Cl. ............................................... 348/240.1
(58) Field of Classification Search .......... 348/240.99, 348/240.1–240.3, 345; 396/76
See application file for complete search history.

(56) References Cited

U.S. PATENT DOCUMENTS

| | | | |
|---|---|---|---|
| 7,154,544 B2 | 12/2006 | Kowno et al. | |
| 7,430,008 B2* | 9/2008 | Ambiru et al. | 348/333.12 |
| 7,483,074 B2* | 1/2009 | Bang et al. | 348/373 |
| 2001/0013897 A1 | 8/2001 | Kowno et al. | |
| 2002/0093578 A1 | 7/2002 | Kowno et al. | |
| 2004/0046886 A1* | 3/2004 | Ambiru et al. | 348/333.12 |
| 2007/0098395 A1* | 5/2007 | Battles et al. | 396/299 |
| 2007/0249389 A1* | 10/2007 | Hotta | 455/552.1 |
| 2008/0225130 A1* | 9/2008 | Paaaho et al. | 348/222.1 |
| 2009/0273849 A1 | 11/2009 | Nakamur et al. | |

FOREIGN PATENT DOCUMENTS

| | | |
|---|---|---|
| JP | 10-4531 | 1/1988 |
| JP | 8-163541 | 6/1996 |
| JP | 2002-91649 | 3/2002 |
| JP | 2003-338975 | 11/2003 |

OTHER PUBLICATIONS

Japan Office action, mail date is Oct. 16, 2012.
English language translation of Japan Office action, mail date is Oct. 16, 2012.

* cited by examiner

*Primary Examiner* — Chieh M Fan
*Assistant Examiner* — Ahmed A Berhan
(74) *Attorney, Agent, or Firm* — Greenblum & Bernstein, P.L.C.

(57) ABSTRACT

A zoom adjustment system, comprising a touch panel, a course detector, and a first zoom adjuster, is provided. The touch panel has an input surface. The touch panel detects a certain location on the input surface when it is touched. The touch panel detects a touched location. The course detector detects a course traced on the input surface by the touched location when the touched location is moved about on the input surface while maintaining continuous contact with the input surface. The first zoom adjuster adjusts a magnification of a photographic optical system according to the traced course detected by the course detector.

14 Claims, 11 Drawing Sheets

ZOOM ADJUSTMENT SYSTEM AND CAMERA

BACKGROUND OF THE INVENTION

1. Field of the Invention

The present invention relates to a zoom adjustment system that adjusts the magnification of a photographic optical system of a camera with a simplified input command.

2. Description of the Related Art

The magnification of an optical image of a subject to be photographed can be adjusted by changing a focal length of a photographic optical system of a general camera. A recent compact camera has a zoom button through which a command for changing a focal length is input. The magnification can be changed by depressing the zoom button. The adjustment for increasing or decreasing the magnification continues while the zoom button is kept depressed.

However, if the zoom button cannot be released at a user's desired time, the adjusted magnification may be out of a user's desired range. In such a case, it is necessary to repeat the magnification adjustment, and it may be difficult to adjust the magnification quickly and accurately.

U.S. Pat. No. 7,430,008 discloses a digital camera having a touch panel monitor. Various kinds of functions are carried out according to the command input to the touch panel monitor. Such a touch panel monitor can simplify a user's command input operation.

However, it is still difficult to adjust the magnification quickly and accurately even if the invention described in U.S. Pat. No. 7,430,008 is adopted for an input device for adjusting the magnification.

SUMMARY OF THE INVENTION

Therefore, an object of the present invention is to provide a zoom adjustment system that quickly and accurately adjusts the magnification with a simple input operation.

According to the present invention, a zoom adjustment system, comprising a touch panel, a course detector, and a first zoom adjuster, is provided. The touch panel has an input surface. The touch panel detects a certain location on the input surface when it is touched. The touch panel detects a touched location. The course detector detects a course traced on the input surface by the touched location when the touched location is moved about on the input surface while maintaining continuous contact with the input surface. The first zoom adjuster adjusts a magnification of a photographic optical system according to the traced course detected by the course detector.

According to the present invention, a camera, comprising a photographic optical system, a touch panel, a course detector, and a first zoom adjuster, is provided. The magnification of the photographic optical system is adjustable. The touch panel has an input surface. The touch panel detects a certain location on the input surface when it is touched. The touch panel detects a touched location. The course detector detects a course traced on the input surface by the touched location when the touched location is moved about on the input surface while maintaining continuous contact with the input surface. The first zoom adjuster adjusts the magnification of the photographic optical system according to the traced course detected by the course detector.

BRIEF DESCRIPTION OF THE DRAWINGS

The objects and advantages of the present invention will be better understood from the following description, with reference to the accompanying drawings in which.

DESCRIPTION OF THE PREFERRED EMBODIMENTS

The present invention is described below with reference to the embodiment shown in the drawings.

Figure 1:
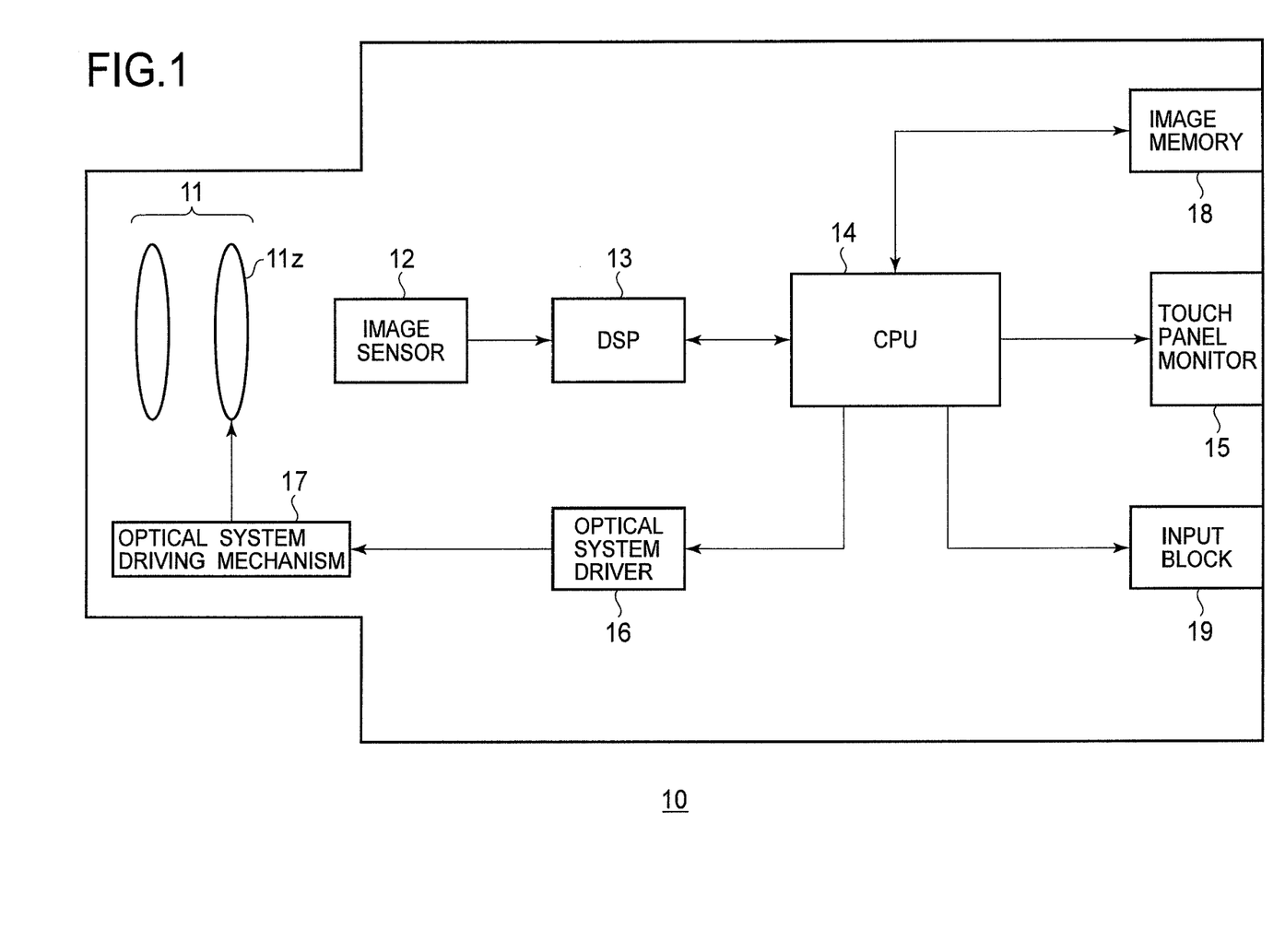
FIG. 1 is a block diagram showing the internal structure of a digital camera having the zoom adjustment system of the embodiments of the present invention.

In FIG. 1, a digital camera 10 comprises a photographic optical system 11, an image sensor 12, a DSP (Digital Signal Processor) 13, a CPU 14 (course detector, second zoom adjuster, image processor), a touch panel monitor 15, an optical system driver 16, an optical system driving mechanism 17 (first zoom adjuster), and other components.

The photographic optical system 11 comprises multiple lenses, including a zoom lens group 11z. The focal length of the photographic optical system 11 is adjusted by moving the zoom lens group 11z along the optical axis of the photographic optical system 11, and then the magnification of an optical image of a subject that reaches a light-receiving surface of the image sensor 12 is adjusted. The zoom lens group 11z can be located at one of first to fourth locations.

The zoom lens group 11z is supported by the optical system driving mechanism 17. The optical system driving mechanism is comprised of a motor (not depicted) that moves the zoom lens group 11z to one of the first to fourth locations.

The location that minimizes the focal length of the photographic optical system 11 from among the movable range of the zoom lens group 11z is defined as the first location. On the other hand, the location that maximizes the focal length is defined as the fourth location. Two intermediate locations in order from the first location to the fourth location are defined as the second and third locations respectively. Accordingly, the closer the location of the zoom lens group 11a is to the first location, the lower the magnification of the optical image. On the other hand, the closer the location of the zoom lens group 11z is to the fourth location, the higher the magnification.

The motor of the optical system driving mechanism 17 is connected to the optical system driver 16. The motor is driven by the optical system driver 16. The optical system driver 16 is connected to the CPU 14. The movement of the zoom lens group 11z is controlled by the CPU 14.

The photographic optical system 11 is optically connected to the image sensor 12. An optical image of a subject through the photographic optical system 11 is incident on the light-receiving surface of the image sensor 12. The image sensor 12 is, for example, a CCD image sensor. When the image sensor 12 captures the optical image of the subject upon its light-receiving surface, the image sensor 12 generates an image signal corresponding to the captured optical image.

While standing by for taking a photograph, one frame of a moving image signal, which is an image signal used for displaying a moving image, is generated every 1/30 second according to a first driving method in order to display a real-time moving image on the touch panel monitor 15. The first driving method is an adequate method for driving the image sensor 12 so that the image sensor 12 can quickly generate every frame of a moving image signal with lowering the image resolution. On the other hand, when a command for carrying out a release operation is input while standing by for taking a photograph, one frame of a static image signal is generated according to the second driving method. The second driving method is an adequate method for driving the image sensor 12 so that the image sensor 12 can generate one frame of an image signal at high image resolution.

The image sensor 12 is connected to the DSP 13. The generated image signals are transmitted to the DSP 13. The DSP 13 carries out predetermined signal processing on the received image signal. The DSP 13 is connected to the CPU 14. The image signal, having undergone predetermined signal processing, is transmitted to the CPU 14.

When the CPU 14 receives the moving image signals, the CPU 14 transmits the moving image signals only to the touch panel monitor 15. When the CPU 14 receives the static image signal, the CPU 14 transmits the static image signal to the touch panel monitor 15 and an image memory 18.

The touch panel monitor 15 comprises a display (not depicted in FIG. 1) and a location detector (not depicted). The image signal transmitted from the CPU 14 is received by the display. An image corresponding to the received image signal is displayed on the monitor.

As described above, a moving image signal is generated every 1/30 second and transmitted to the touch panel monitor 15. Accordingly, a real-time moving image is displayed on the touch panel monitor 15 by changing the displayed static image every 1/30 second while standing by for taking a photograph.

The location detector detects the touch of a user or a stylus to the surface of the display (input surface) and the touched location on the surface. Some commands that correspond to certain combinations of the image displayed on the display of the touch panel monitor and the touched location are predetermined. As described later, the touch panel monitor 15 is used as an input device of the digital camera 10.

In the image memory 18, the received static image signal is stored. The digital camera has a display mode. When the digital camera 10 is in the display mode, the static image signal stored in the image memory 18 is transmitted to the touch panel monitor 15 via the CPU 14, and then the static image corresponding to the transmitted static image signal is displayed on the touch panel monitor 15.

The CPU 14 is connected to an input block 19 that comprises a power button (not depicted), a release button (not depicted), and other input devices. On the basis of the command input to the input block 19, the CPU 14 controls the operations of the components of the digital camera.

As described above, the touch panel monitor 15 is also used as an input device. When the touched location is detected, the displayed image and the touched location are communicated to the CPU 14. Then, the CPU 14 determines a command input corresponding to the combination of the displayed image and the touched location. The CPU 14 controls the operations of components of the digital camera on the basis of the determined command input.

Next, a zoom adjustment of the digital camera 10 that occurs while standing by for taking a photograph is explained. As described above, a real-time moving image is displayed on the touch panel monitor 15 while standing by for taking a photograph. When something making contact with the touch panel display, such as a user's finger or a stylus, is slid on the surface of the display, the zoom adjustment is carried out. In other words, when a touched location is moved while maintaining continuous contact with the surface of the display, the zoom adjustment is carried out.

When the location on the display touched by either a finger or stylus is moved along a circular course, the zoom lens group 11z is moved according to the size of the circular course. The smaller the size of the circular course causes the zoom lens group 11z to be moved in the direction of increasing magnification.

The size of the circular course may be detected according to various methods. In this embodiment, the distance between the highest and lowest points on the circular course, i.e., the difference between the maximum and minimum ordinates of the circular course on the display is detected as a size of the circular course.

Figure 2:
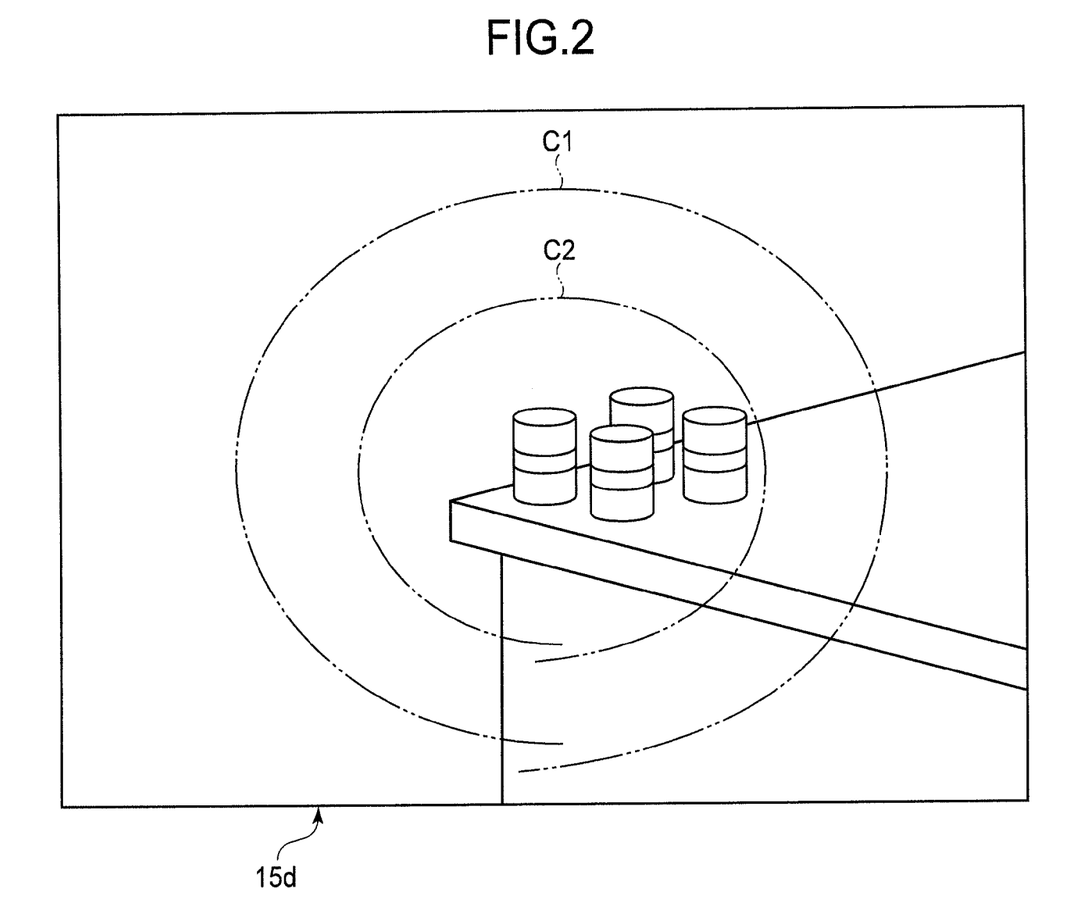
FIG. 2 illustrates a real-time moving image displayed on the display while standing by for taking a photograph.

For example, as shown FIG. 2, when the zoom lens group 11z is located at the second location and the touched location for an image displayed on the display 15d is moved along a first circle (see "C1") of a first size, the zoom lens group 11z is moved to the third location. In addition, when the touched location is moved along a second circle (see "C2") of a second size that is smaller than the first size, the zoom lens group 11z is moved to the fourth location. In addition, when the touched location is moved near the frame of the display 15d, the zoom lens group 11z is moved to the first location.

Figure 3:
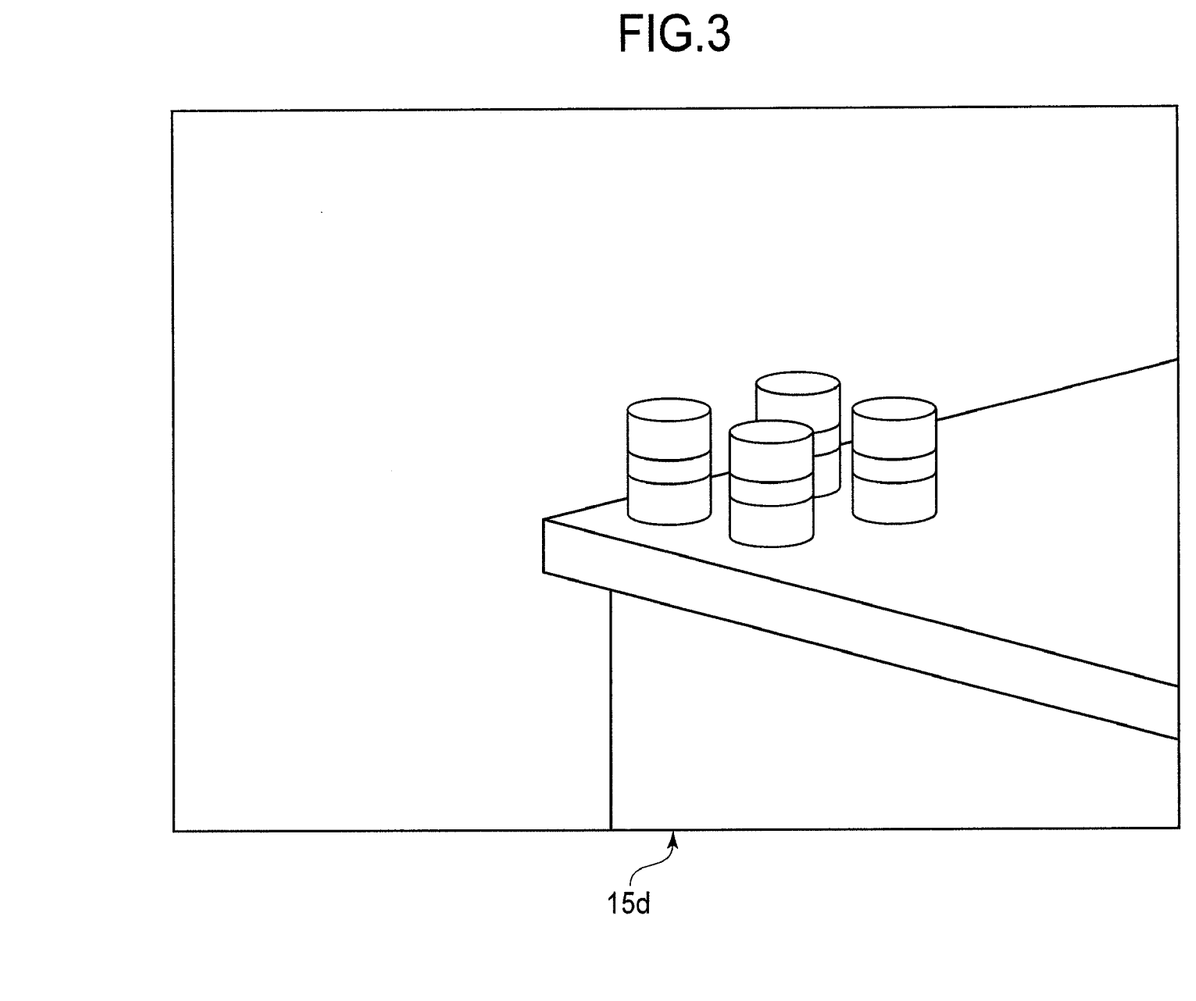
FIG. 3 illustrates the real-time moving image enlarged from the real-time moving image of FIG. 2 by changing the location of the zoom lens group from the second location to the third location.

By moving the zoom lens group 11z from the second location to the third location, an optical image of a subject that reaches the image sensor is enlarged. Because optical zoom-in is carried out, a central part of an originally displayed image is enlarged. A part of the entire original image is enlarged so that the enlarged part within the circular course on the original image can fill the entire display 15d (see FIG. 3).

Figure 4:
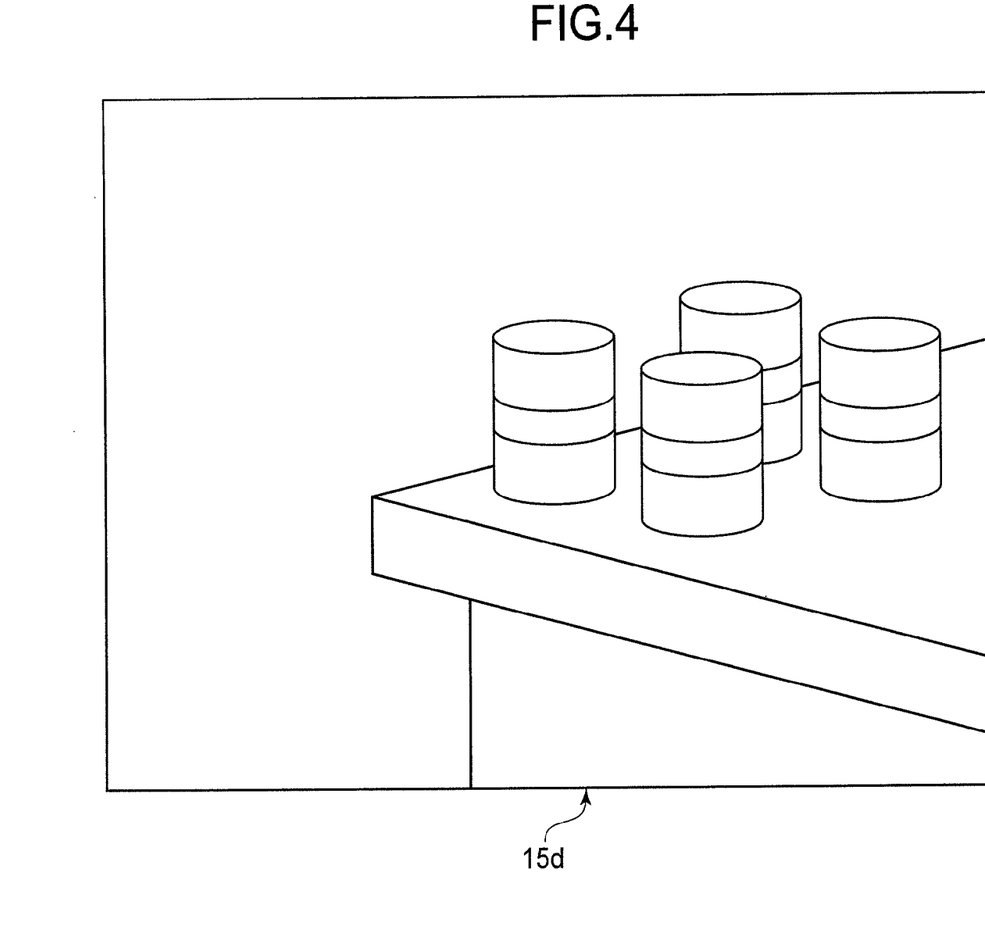
FIG. 4 illustrates the real-time moving image enlarged from the real-time moving image of FIG. 2 by changing the location of the zoom lens group from the second location to the fourth location.

By moving the zoom lens group 11z from the second location to the fourth location, a real-time image enlarged by a greater magnification than that in the case of the zoom lens group 11z in the third location is displayed on the display 15d (see FIG. 4).

Figure 5:
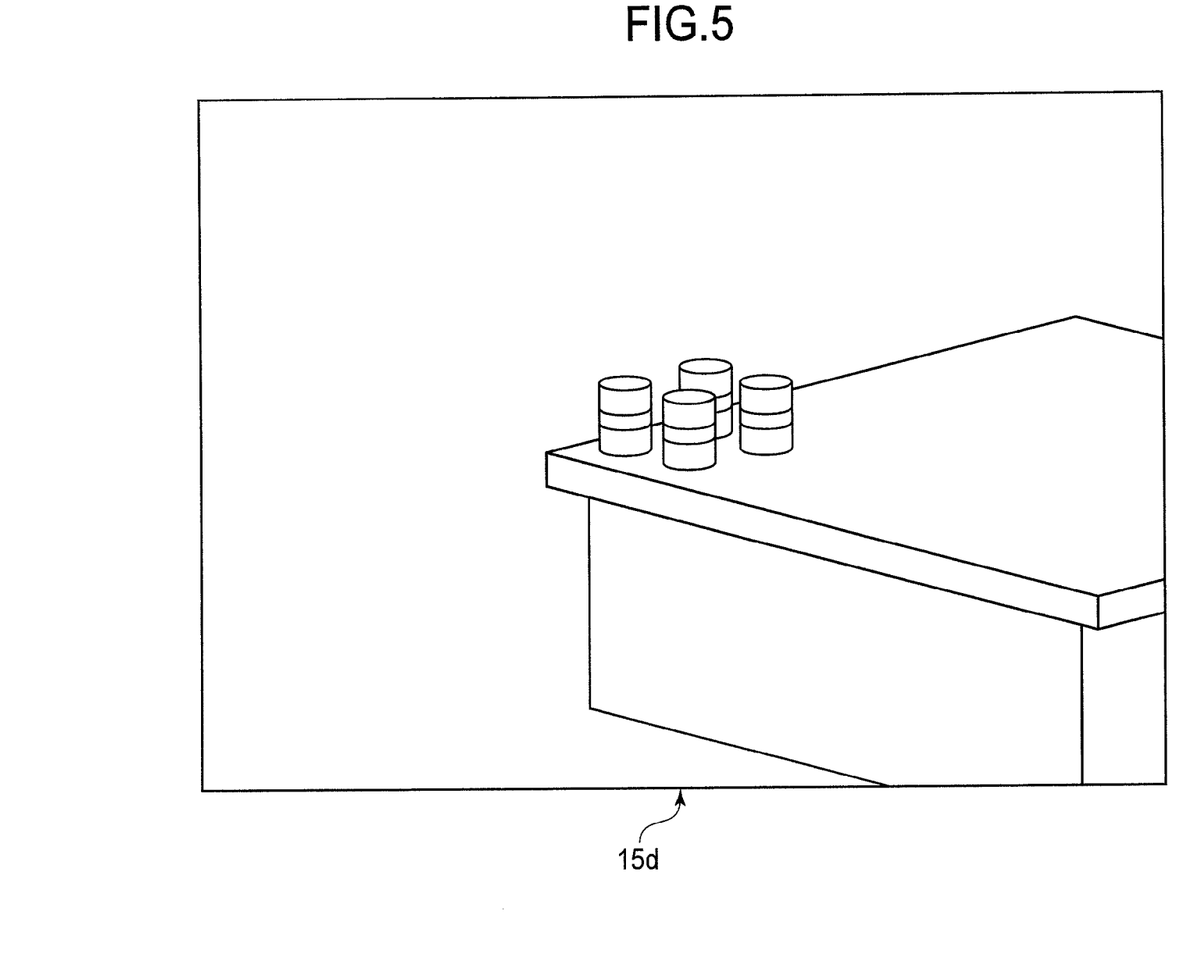
FIG. 5 illustrates the real-time moving image reduced from the real-time moving image of FIG. 2 by changing the location of the zoom lens group from the second location to the first location.

On the other hand, by moving the zoom lens group 11z from the second location to the first location, a real-time image is displayed with zooming out (see FIG. 5).

The digital camera has a digital zoom-in function. By using the digital zoom-in function, a real-time image displayed on the display 15d can be enlarged by a greater amount than in the case of the zoom lens group 11z located in the fourth location. In the digital zoom-in function, by carrying out signal processing to extract a part of the moving image signal and signal processing to enlarge an image corresponding to the extracted part, a real-time image is enlarged.

For example, when the zoom lens group 11z is located at the second location and the touched location of an image displayed on the display 15d is moved along a third circle of a third size, which is smaller than the second size, the digital zoom-in function is carried out in addition to moving the zoom lens group 11z to the fourth location.

When the digital zoom-in function is carried out, the message providing notice that the digital zoom-in function is being carried out is superimposed on the real-time image. The message is displayed in order to notify a user operating the digital zoom-in function because image resolution of a real-time moving image and a static image are both reduced by using the digital zoom-in function.

Next, the zoom adjustment process carried out by the CPU 14 is explained using FIGS. 6-10. The zoom adjustment process commences when the touched location is moved as continuous contact made by a finger or object touching the surface of the display 15d is maintained while standing by for the taking of a photograph.

Figure 6:
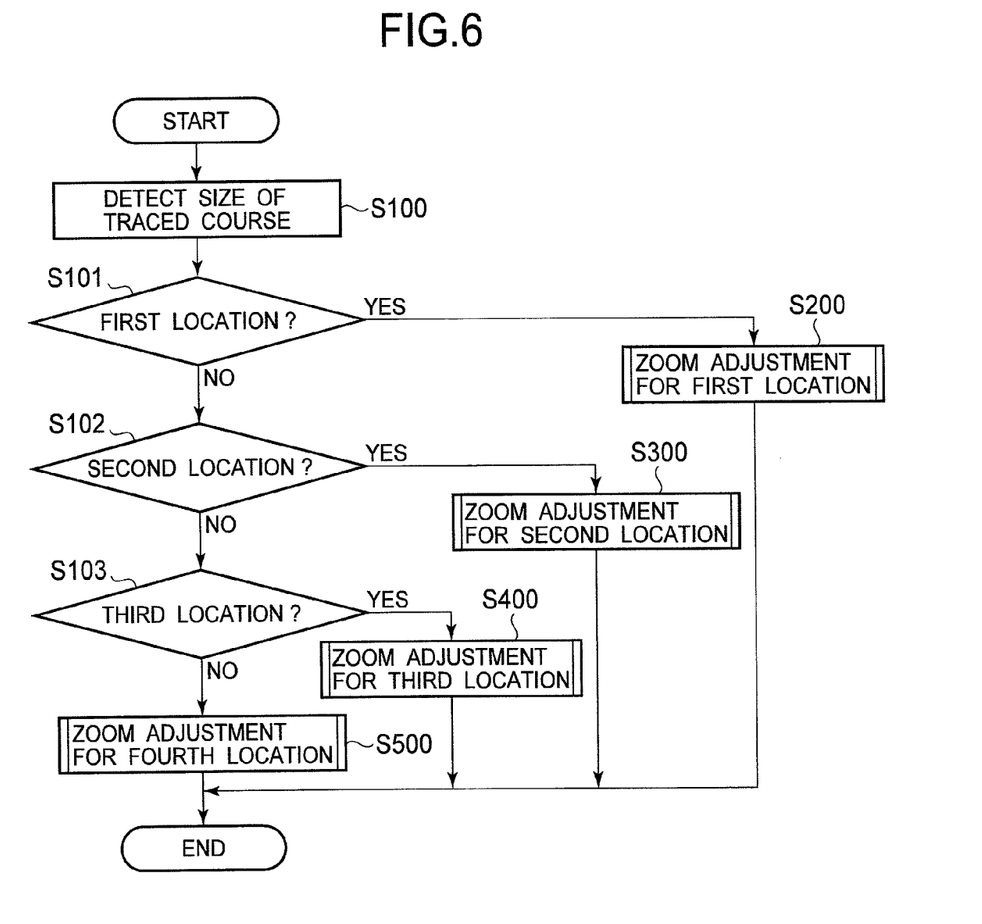
FIG. 6 is a flowchart illustrating the zoom adjustment process that is carried out by the CPU.

As shown in FIG. 6, at step S100, the CPU 14 detects the size of the course traced by the movement of the touched location. As described above, the size of the traced course is calculated by subtracting the minimum ordinate from the maximum ordinate of the traced course on the display. After calculation of the size of the traced course, the process proceeds to step S101.

In steps S101-S103, the CPU 14 determines a current location of the zoom lens group 11z. When the zoom lens group 11z is located at the first location, the process proceeds to step S200, where a zoom adjustment for the first location is carried out. When the zoom lens group 11z is located at the second location, the process proceeds to step S300, where a zoom adjustment for the second location is carried out. When the zoom lens group 11z is located at the third location, the process proceeds to step S400, where a zoom adjustment for the third location is carried out. When the zoom lens group 11z is not located at the first to third locations, but at the fourth location instead, the process proceeds to step S500, where a zoom adjustment for the fourth location is carried out.

After carrying out a zoom adjustment for one of the first, second, third, or fourth locations, the zoom adjustment process terminates.

Figure 7:
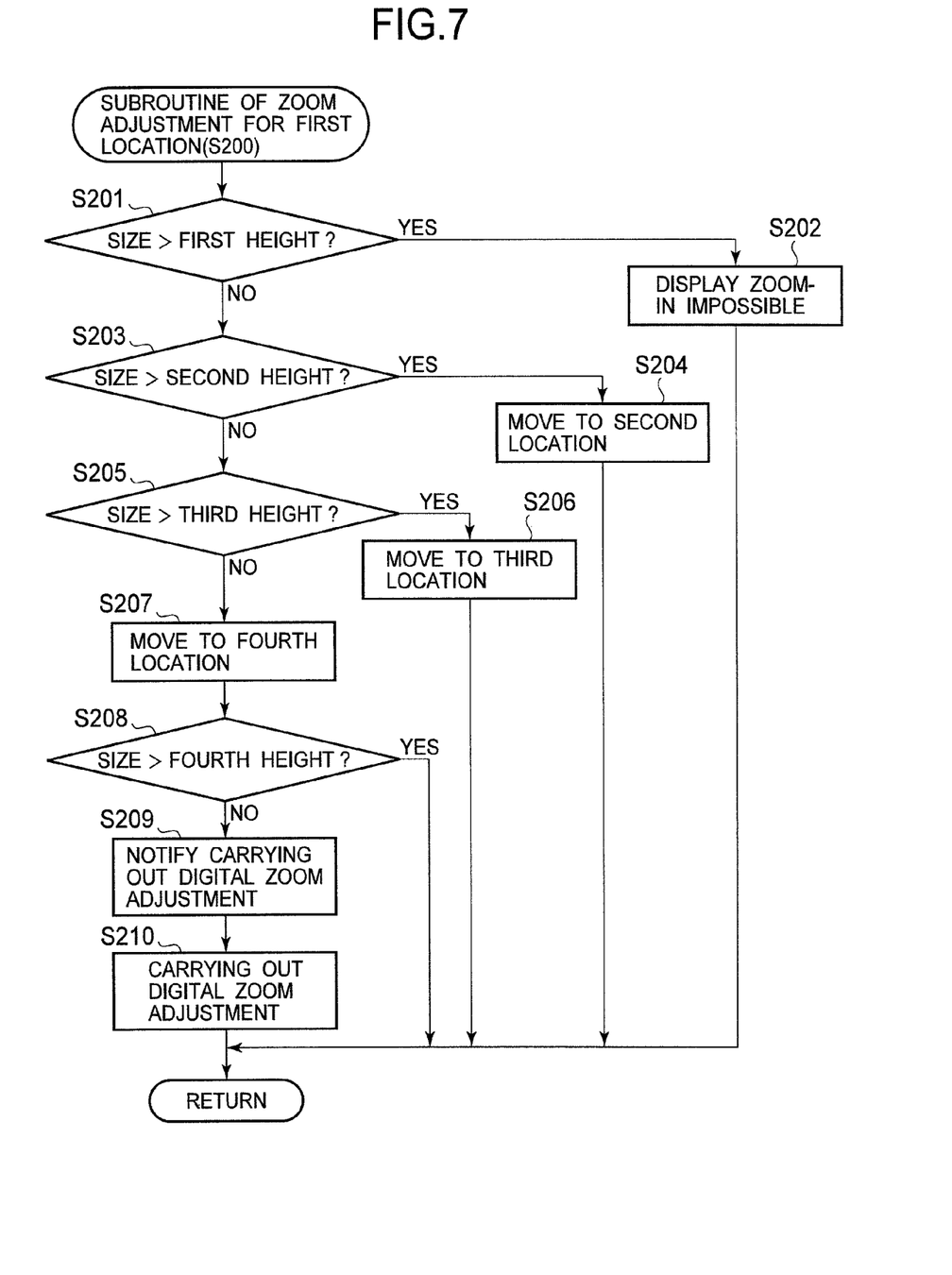
FIG. 7 is a flowchart illustrating the subroutine of the zoom adjustment for the first location.

Next, a subroutine of the zoom adjustment for the first location (S200) is explained below. As shown in FIG. 7, at step S201, the CPU 14 determines whether or not the size of the traced course is greater than a first height. When the size is greater than the first height, the process proceeds to step S202. On the other hand, when the size is less than or equal to the first height, the process proceeds to step S203.

At step S202, the CPU 14 orders the display 15d to superimpose the message, such as "ZOOM OUT IMPOSSIBLE", on the real-time moving image in order to provide notice that the photographic optical system 11 is adjusted to the minimum magnification of the adjustable range and an image cannot be further zoomed-out. After displaying the message, the subroutine of the zoom adjustment for the first location terminates.

At step S203, the CPU 14 determines whether or not the size of the traced course is greater than a second height, which is less than the first height. When the size is greater than the second height, the process proceeds to step S204. When the size is less than or equal to the second height, the process proceeds to step S205.

At step S204, the CPU 14 orders the optical system driver 16 to move the zoom lens group 11z to the second location. After moving the zoom lens group 11z, the subroutine of the zoom adjustment for the first location terminates.

At step S205, the CPU 14 determines whether or not the size of the traced course is greater than a third height, which is less than the second height. When the size is greater than the third height, the process proceeds to step S206. When the size is less than or equal to the third height, the process proceeds to step S207.

At step S206, the CPU 14 orders the optical system driver 16 to move the zoom lens group 11z to the third location. After moving the zoom lens group 11z, the subroutine of the zoom adjustment for the first location terminates.

At step S207, the CPU 14 orders the optical system driver 16 to move the zoom lens group 11z to the fourth location. After moving the zoom lens group 11z, the process proceeds to step S208.

At step S208, the CPU 14 determines whether or not the size of the traced course is greater than a fourth height, which is less than the third height. When the size is greater than the fourth height, the subroutine of the zoom adjustment for the first location terminates. On the other hand, when the size is less than or equal to the fourth height, the process proceeds to step S209.

At step S209, the CPU 14 orders the display 15d to superimpose the message providing notice that the digital zoom-in function is carried out on a real-time moving image. After displaying the message, the process proceeds to step S210.

At step S210, the CPU 14 orders the DSP 13 to carry out the digital zoom-in function. After carrying out the digital zoo-in function, the subroutine of the zoom adjustment for the first location terminates.

Figure 8:
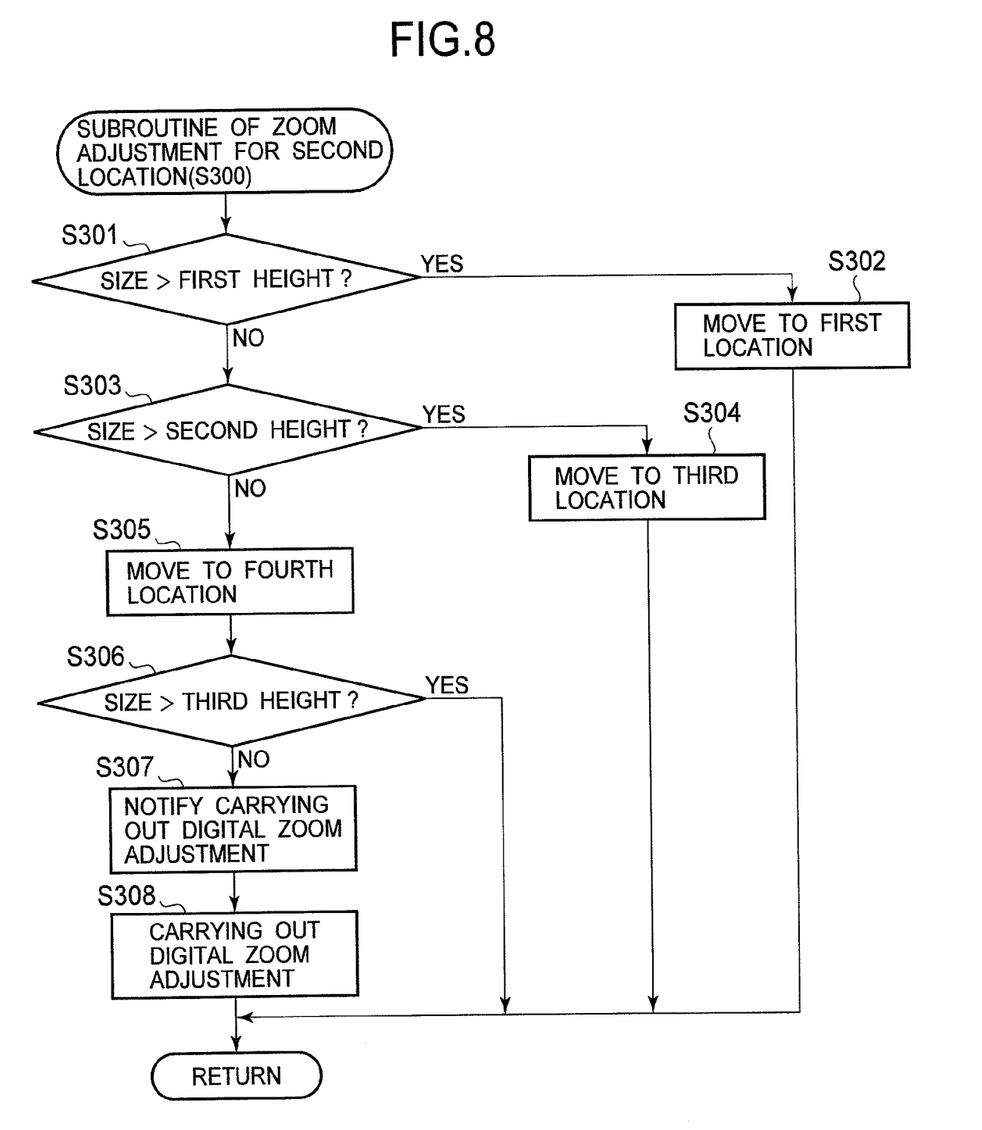
FIG. 8 is a flowchart illustrating the subroutine of the zoom adjustment for the second location.

Next, a subroutine of the zoom adjustment for the second location (S300) is explained below. As shown in FIG. 8, at step S301, the CPU 14 determines whether or not the size of the traced course is greater than the first height. When the size is greater than the first height, the process proceeds to step S302. On the other hand, when the size is less than or equal to the first height, the process proceeds to step S303.

At step S302, the CPU 14 orders the optical system driver 16 to move the zoom lens group 11z to the first location. After moving the zoom lens group 11z, the subroutine of the zoom adjustment for the second location terminates.

At step S303, the CPU 14 determines whether or not the size of the traced course is greater than the second height. When the size is greater than the second height, the process proceeds to step S304. When the size is less than or equal to the second height, the process proceeds to step S305.

At step S304, the CPU 14 orders the optical system driver 16 to move the zoom lens group 11z to the third location. After moving the zoom lens group 11z, the subroutine of the zoom adjustment for the second location terminates.

At step S305, the CPU 14 orders the optical system driver 16 to move the zoom lens group 11z to the fourth location. After moving the zoom lens group 11z, the process proceeds to step S306.

At step S306, the CPU 14 determines whether or not the size of the traced course is greater than the third height. When the size is greater than the third height, the subroutine of the zoom adjustment for the second location terminates. On the other hand, when the size is less than or equal to the third height, the process proceeds to step S307.

At step S307, the CPU 14 orders the display 15d to superimpose the message providing notice that the digital zoom-in function is carried out on a real-time moving image. After displaying the message, the process proceeds to step S308.

At step S308, the CPU 14 orders the DSP 13 to carry out the digital zoom-in function. After carrying out the digital zoom-in function, the subroutine of the zoom adjustment for the second location terminates.

Figure 9:
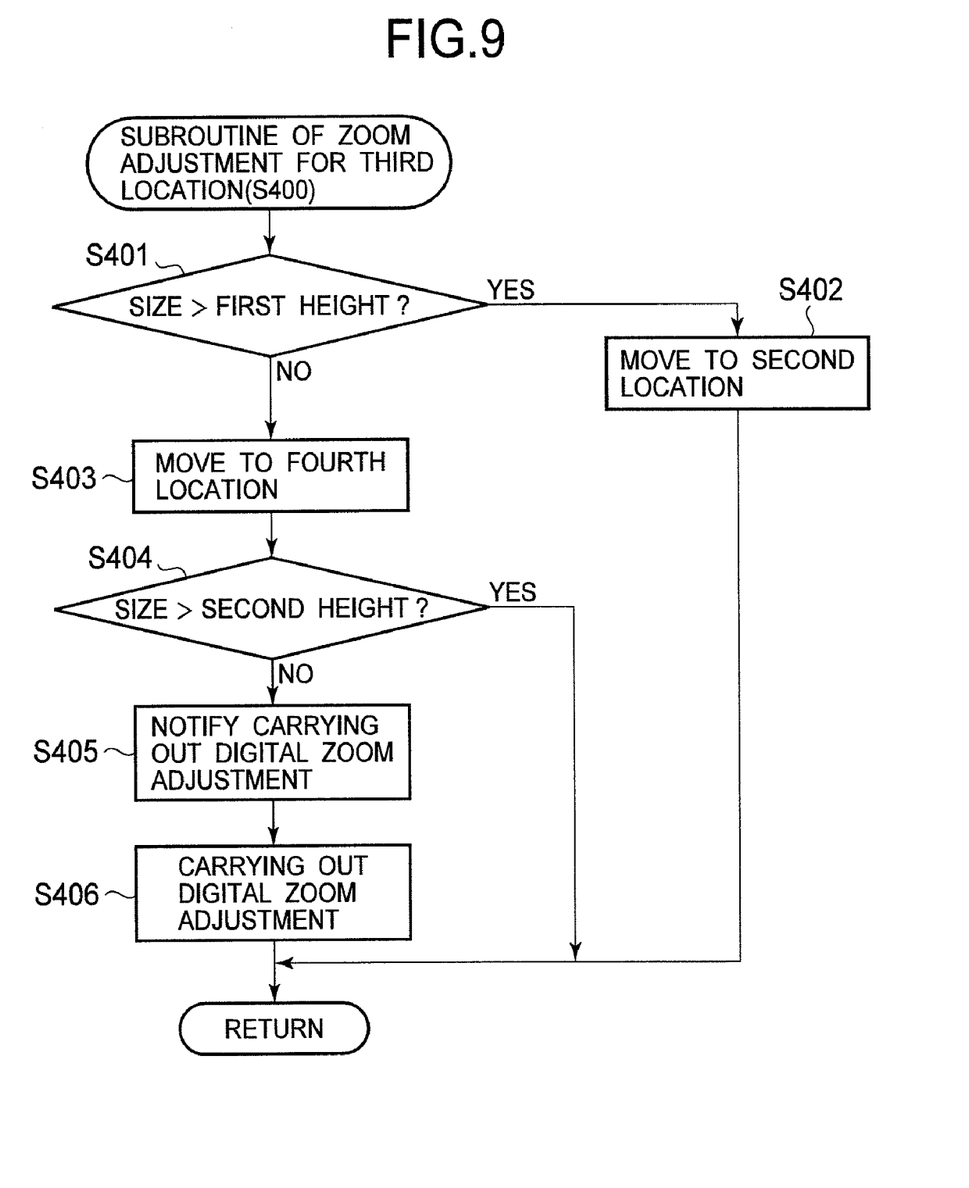
FIG. 9 is a flowchart illustrating the subroutine of the zoom adjustment for the third location.

Next, a subroutine of the zoom adjustment for the third location (S400) is explained below. As shown in FIG. 9, at step S401, the CPU 14 determines whether or not the size of the traced course is greater than the first height. When the size is greater than the first height, the process proceeds to step S402. On the other hand, when the size is less than or equal to the first height, the process proceeds to step S403.

At step S402, the CPU 14 orders the optical system driver 16 to move the zoom lens group 11z to the second location. After moving the zoom lens group 11z, the subroutine of the zoom adjustment for the third location terminates.

At step S403, the CPU 14 orders the optical system driver 16 to move the zoom lens group 11z to the fourth location. After moving the zoom lens group 11z, the process proceeds to step S404.

At step S404, the CPU 14 determines whether or not the size of the traced course is greater than the second height. When the size is greater than the second height, the subroutine of the zoom adjustment for the third location terminates. When the size is less than or equal to the second height, the process proceeds to step S405.

At step S405, the CPU 14 orders the display 15d to superimpose the message provide notice that the digital zoom-in function is carried out on a real-time moving image. After displaying the message, the process proceeds to step S406.

At step S406, the CPU 14 orders the DSP 13 to carry out the digital zoom-in function. After carrying out the digital zoom-in function, the subroutine of the zoom adjustment for the third location terminates.

Figure 10:
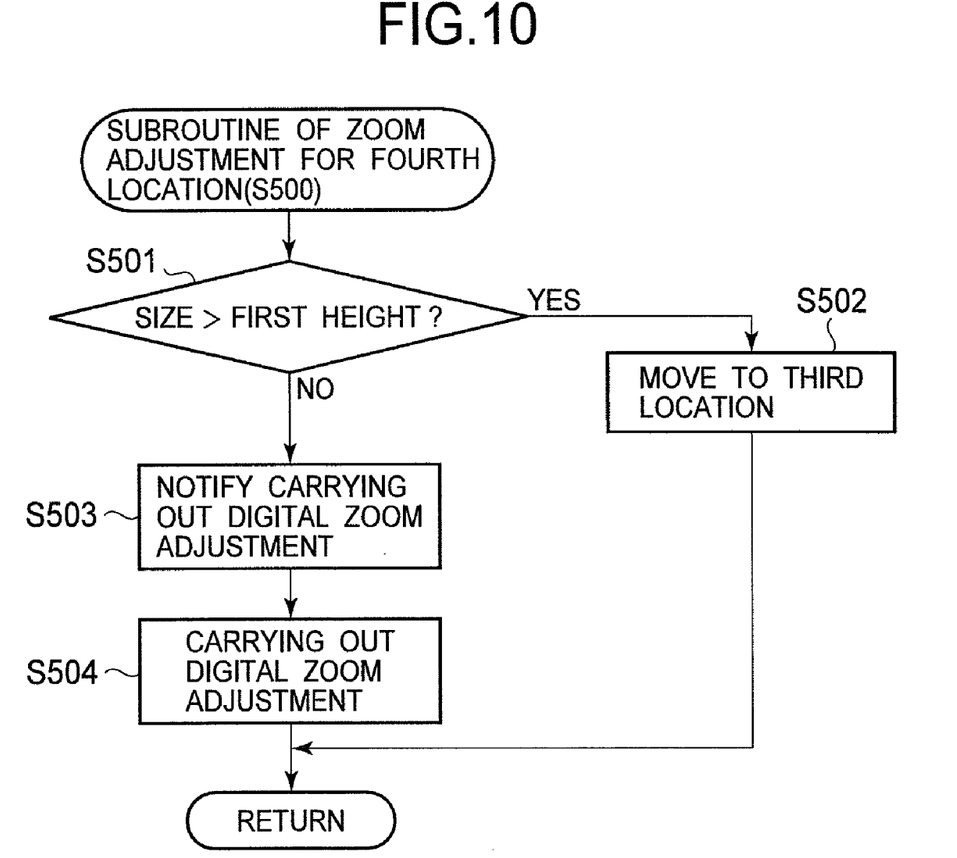
FIG. 10 is a flowchart illustrating the subroutine of the zoom adjustment for the fourth location.

Next, a subroutine of the zoom adjustment for the fourth location (S500) is explained below. As shown in FIG. 10, at step S501, the CPU 14 determines whether or not the size of the traced course is greater than the first height. When the size is greater than the first height, the process proceeds to step S502. On the other hand, when the size is less than or equal to the first height, the process proceeds to step S503.

At step S502, the CPU 14 orders the optical system driver 16 to move the zoom lens group 11z to the third location. After moving the zoom lens group 11z, the subroutine of the zoom adjustment for the fourth location terminates.

At step S503, the CPU 14 orders the display 15d to superimpose the message providing notice that the digital zoom-in function is carried out on a real-time moving image. After displaying the message, the process proceeds to step S504.

At step S504, the CPU 14 orders the DSP 13 to carry out the digital zoom-in function. After carrying out the digital zoom-in function, the subroutine of the zoom adjustment for the fourth location terminates.

In the above embodiment, the zoom lens group 11z can be moved to the predetermined location according to the size of the course traced by the movement of the touched location on the surface of the display 15d.

According to the above input method, it is possible to carry out optical zoom adjustment by moving the zoom lens group 11z quickly and accurately. It is especially easy for a user to adjust the magnification because an optical zoom adjustment is carried out so that a partial image within the circular course in the entire real-time image is maximized on the display 15d.

In addition, in the above embodiment, after an optical zoom adjustment is carried to achieve maximum magnification, the digital zoom-in function is carried out. A user can take a photograph with a greater magnification than the maximum from using only the optical zoom adjustment.

The height of the circular course of the touched location is detected as the size of the circular course, in the embodiment. However, the size can be detected according to another method. For example, the size can be detected according to the moved area of the touched location.

Figure 11:
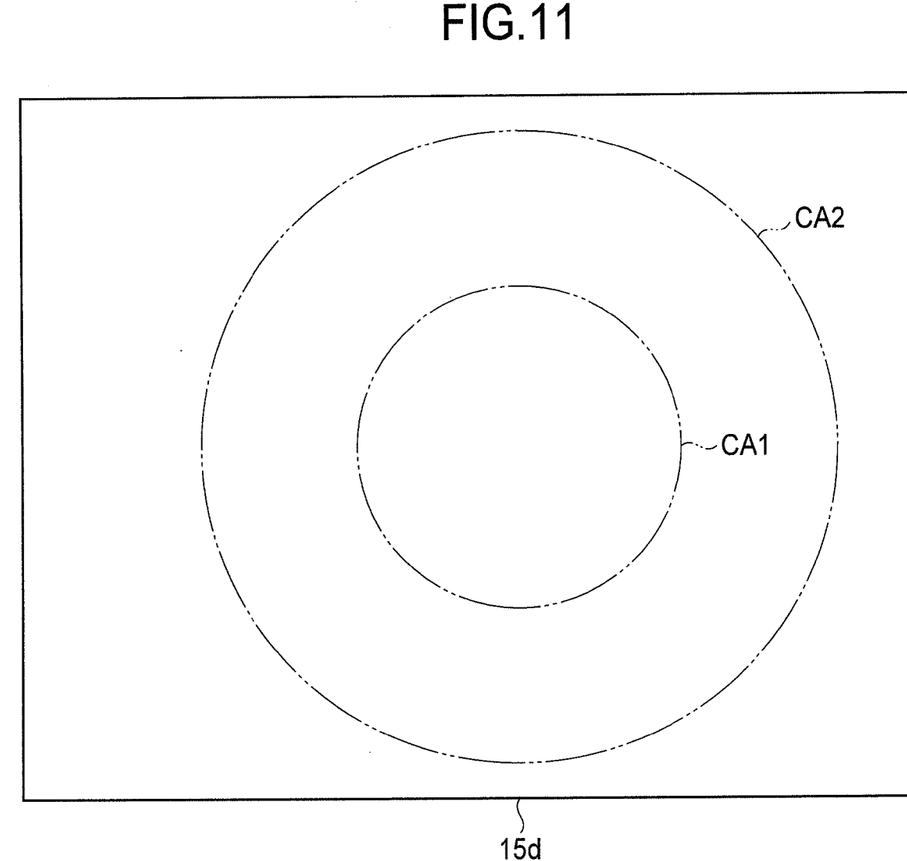
FIG. 11 illustrates the predetermined first and second circular areas on the display in order to explain their locations and sizes.

The method of detecting the size according to the moved area of the touched location is explained briefly below. As shown in FIG. 11, first and second circular areas (see "CA1" and "CA2") are predetermined on the display 15d. The center of the first and second circular area is in agreement with the center of the display 15d. In addition, the second circular area includes the first circular area.

When the touched location is moved only in the second circular area, the zoom lens group 11z is moved so that the magnification of an optical image of a subject increases. In addition, it is determined whether the touched location is moved only in the first circular area or only in the area outside of the first circular area but within the second circular area. An optical image of a subject is enlarged by the predetermined magnification according to the area on which the touched location is moved.

When the touched location is moved only in the area outside of the first circular area but within the second circular area, the size of the circular course is determined to be within a first range. And then, the zoom lens group 11z is moved so that an optical image of a subject is enlarged by a predetermined magnification. In addition, when the touched location is moved only in the first circular area, the size of the circular course is determined to be within a second range, which is included in the first range. And then, the zoom lens group 11z is moved so that an optical image of a subject is enlarged at greater magnification than the predetermined magnification. In addition, when the touched location is moved on the area outside of the second circular area, the size of the circular course is determined to be outside of the first range. And then, the zoom lens group 11z is moved so that an optical image of a subject is reduced.

The height between the highest and lowest points in the circular course is detected as the size of the circular course, in the above embodiment. However, a diameter of the circular course along any direction (first direction) can be detected as the size of the circular course. Or, the maximum, minimum, or average diameter of the circular course along certain directions can be detected as the size.

The zoom lens group 11z is moved when the course traced by the movement of the touched location is circular, in the above embodiment. However, the shape of the traced course is not limited to the circular shape. The course for ordering the zoom lens group 11a to move may be rectangular or triangular. Or the course may not be closed. Furthermore, the course may be a straight line. The same effect can be achieved by carrying out a zoom adjustment according to the size of the course traced by the movement of the touched location.

The smaller the circle of the traced course of the touched location, the greater the adjustment of the location of the zoom lens group 11z in the direction that corresponds to increasing magnification, in the above embodiment. However, the zoom lens group 11z may be moved according to the size of the traced course.

The magnification is adjusted so that the size of the circular course of the touched location on the original image approaches the size of the display 15d, and a partial image within the circular course in the original image is enlarged maximum within the entire display 15d, in the above embodiment. However, it is not necessary to adjust the magnification in such a manner. It is possible to adjust the magnification quickly and accurately with a simple input operation even if the magnification is not adjusted according to this manner.

The zoom lens group 11z is moved to one of the first to fourth locations, in the above embodiment. However, the zoom lens group 11z can be moved to one of a plurality of locations.

When the size of the circular course exceeds a predetermined size, the zoom lens group 11z is moved so that the magnification is reduced, in the above embodiment. However, it is not necessary to reduce the magnification.

In regard to the movement of the touched location on the display 15d, the input operations for raising and lowering the magnification are equal, in the above embodiment. However, the input operation for lowering the magnification can be different from that for raising the magnification. For example, when a plurality of touches to any location on a display 15d is detected, the magnification may be reduced.

When the touched location is moved on the display 15d, the optical zoom adjustment and the digital zoom adjustment are both carried out, in the above embodiment. However, both the optical and digital zoom adjustments do not have to be carried out by detecting the movement of the touched location. Even if one zoom adjustment is carried out by a command input to a zoom button, it is possible to carry out the other zoom adjustment quickly and accurately by detecting the movement of the touched location.

When the digital zoom adjustment is carried out in addition to the optical zoom adjustment, the message providing notice to carry out the digital zoom adjustment is displayed, in the above embodiment. However, it is not necessary to display the message.

The touch panel monitor 15 is used for detecting a touched location on a surface, in the above embodiment. However, a touch panel that is a pointing device having an input surface to detect a touched location, but does not display an image, can also be used.

Although the embodiments of the present invention have been described herein with reference to the accompanying drawings, obviously many modifications and changes may be made by those skilled in this art without departing from the scope of the invention.

The present disclosure relates to subject matter contained in Japanese Patent Application No. 2008-317518 (filed on Dec. 12, 2008), which is expressly incorporated herein, by reference, in its entirety.

The invention claimed is:

1. A zoom adjustment system comprising:
a touch panel that has an input surface, the touch panel detecting a touch on the input surface and a touched location on the input surface, the input surface being divided into a plurality of areas;
a course detector that detects a course traced on the input surface by the touched location when the touched location is moved on the input surface while maintaining continuous contact with the input surface;
a first zoom adjuster that adjusts the magnification of a photographic optical system, the photographic optical system being configured to stop a lens at a plurality of locations to perform an optical zoom; and
a first detector that detects a first variable,
wherein the first zoom adjuster determines which of the plurality of areas the detected traced course passes through, and changes the magnification of the photographic optical system depending upon a determined area,
wherein the first zoom adjuster adjusts the magnification of the photographic optical system according to a size of the traced course,
the first variable varying according to the magnification of the photographic optical system,
a plurality of size thresholds being predetermined in order to compare with the size of the traced course,
the first zoom adjuster selectin the size threshold that is immediately smaller than the size of the traced course,
the first zoom adjuster adjusting the magnification of the photographic optical system according to a combination of the selected size threshold and the first variable detected by the first detector,
the number of the size thresholds to compare with the size of the traced course decreasing as the magnification of the photographic optical system based on the first variable increases.

2. The zoom adjustment system according to claim 1, wherein the first zoom adjuster determines the size of the traced course on the basis of maximum and minimum values of a first axis along a first direction on the input surface.

3. The zoom adjustment system according to claim 2, wherein the first zoom adjuster raises the magnification of the photographic optical system so that a distance between the maximum and minimum values of the first axis approaches a distance of a frame of the input surface along the first direction.

4. The zoom adjustment system according to claim 1, wherein the first zoom adjuster reduces the magnification of the photographic optical system as the size of the traced course becomes larger.

5. The zoom adjustment system according to claim 1, wherein the first zoom adjuster reduces the magnification of the photographic optical system when the size of the traced course exceeds a predetermined size on the input surface.

6. The zoom adjustment system according to claim 1, wherein the first zoom adjuster adjusts the magnification of the photographic optical system according to an area outlined by the traced course on the input surface.

7. The zoom adjustment system according to claim 1, wherein,
the plurality of areas include first and second areas, the first area enclosing the second area, and
the first zoom adjuster increases the magnification of the photographic optical system when the traced course passes only within the second area, and the first zoom adjuster increases the magnification of the photographic optical system more when the traced course passes only within the first area than when the traced course passes only within the second area.

8. The zoom adjustment system according to claim 7, wherein,
the plurality of areas further includes a third area including the second area, and
the first zoom adjuster reduces the magnification of the photographic optical system when the traced course passes within the third area.

9. The zoom adjustment system according to claim 1, further comprising a second zoom adjuster that increases magnification of a digital zoom after the magnification of the photographic optical system is adjusted to a maximum adjustable value, the magnification of the digital zoom is increased by extracting a part of an optical image passing through the photographic optical system and captured by an image sensor and by enlarging the extracted image.

10. The zoom adjustment system according to claim 9, further comprising an image controller that orders a monitor to display a first message when the second zoom adjuster commences to increase the magnification of the digital zoom, the first message providing notice that the magnification of the digital zoom is being increased.

11. The zoom adjustment system according to claim 1, wherein the touch panel is a touch panel monitor, a real-time image being displayed on the input surface, the real-time image being an optical image that can be immediately photographed.

12. A camera comprising:
a photographic optical system of which magnification is adjustable, the photographic optical system configured to stop a lens at a plurality of locations to perform an optical zoom;
a touch panel that has an input surface, the touch panel detecting a touch on the input surface and a touched location on the input surface, the input surface being divided into a plurality of areas;
a course detector that detects a course traced on the input surface by the touched location when the touched location is moved on the input surface while maintaining continuous contact with the input surface;
a first zoom adjuster that adjusts the magnification of the photographic optical system; and
a first detector that detects a first variable,
wherein the first zoom adjuster determines which of the plurality of areas the detected traced course passes through, and changes the magnification of the photographic optical system depending upon a determined area,
wherein the first zoom adjuster adjusts the magnification of the photographic optical system according to a size of the traced course,
the first variable varying according to the magnification of the photographic optical system,
a plurality of size thresholds being predetermined in order to compare with the size of the traced course,
the first zoom adjuster selecting the size threshold that is immediately smaller than the size of the traced course,
the first zoom adjuster adjusting the magnification of the photographic optical system according to a combination of the selected size threshold and the first variable detected by the first detector,
the number of the size thresholds to compare with the size of the traced course decreasing as the magnification of the photographic optical system based on the first variable increases.

13. The zoom adjustment system according to claim 1, wherein the first zoom adjuster changes the magnification of photographic optical system by moving the lens from one to another of the plurality of locations.

14. The camera according to claim 12, wherein the first zoom adjuster changes the magnification of photographic optical system by moving the lens from one to another of the plurality of locations.

* * * * *